United States Patent [19]
Bergano

[11] Patent Number: 5,969,806
[45] Date of Patent: Oct. 19, 1999

[54] CHROMATIC DISPERSION MEASUREMENT IN A FIBER OPTIC CABLE

[75] Inventor: Neal S. Bergano, Lincroft, N.J.

[73] Assignee: Tyco Submarine Systems Ltd., Morristown, N.J.

[21] Appl. No.: 08/884,735

[22] Filed: Jun. 30, 1997

[51] Int. Cl.[6] .......................... G01N 21/41; G01N 21/84
[52] U.S. Cl. ........................................... 356/73.1
[58] Field of Search ............................................ 356/73.1

[56] References Cited

U.S. PATENT DOCUMENTS 4,984,884  1/1991  Ryu et al. .............................. 356/73.1

*Primary Examiner*—Vincent P. McGraw

[57] ABSTRACT

Chromatic dispersion in an optical cable is measured by applying to the cable a signal that rapidly switches between a wavelength generated by a tunable optical source and a different wavelength generated by a reference source. The two sources are modulated in such a way that a delay line phase detection scheme at the far end of the cable can accurately measure relative delay between the tunable source and the reference source. The chromatic dispersion is determined by measuring the relative delay between the two sources for several different wavelengths of the tunable source.

5 Claims, 3 Drawing Sheets

CHROMATIC DISPERSION MEASUREMENT IN A FIBER OPTIC CABLE

FIELD OF THE INVENTION

The invention relates to the optical transmission of information and, more particularly, to a method and apparatus for measuring the chromatic dispersion characteristics of a fiber optic cable when both ends of the cable are not necessarily at the same location.

BACKGROUND OF THE INVENTION

Very long optical fiber transmission paths, such as those employed in undersea or terrestrial lightwave transmission systems and which employ optical amplifier repeaters, are subject to decreased performance due to a host of impairments that accumulate along the length of the optical transmission path. The source of these impairments includes amplified spontaneous emission (ASE) optical noise generated in the Erbium-Doped Fiber-Amplifiers (EDFAs), non-linear effects caused by dependence of the single-mode fiber's index on the intensity of the light propagating through it, and chromatic dispersion, which causes different optical frequencies to travel at different group velocities. Typically it is advantageous to operate long-haul transmission systems at high data rates per channel. For example, useful data rates include multiples of the Synchronous Digital Hierarchy (SDH) standard of 2.5 Gb/s. As the bit rates rise into the gigabit per second range it becomes more critical to understand the accumulated dispersion in the transmission medium.

Chromatic dispersion can directly effect the quality of the transmission by distorting the waveform in a manner that is often referred to as a dispersion penalty (for example, see P. S. Henry et al., "Introduction to Lightwave Systems," Chapter 21 in *Optical Fiber Telecommunications II* Academic Press 1988). Chromatic dispersion can also indirectly effect the quality of the transmission through the fiber's nonlinear index of refraction. For long-haul systems the nonlinear refractive index can couple the data signal with optical noise or with different signal channels in a wavelength division multiplexed system. Chromatic dispersion can reduce the propagation distance over which closely spaced wavelengths overlap (known as phase matching). Accordingly, chromatic dispersion can reduce the amount of interaction through the nonlinear index in the fiber. Therefore, it is important to understand the fiber cable's dispersion characteristics to satisfactorily operate an optical transmission system.

Accurate systems for measuring the chromatic dispersion in single-mode fibers are commercially available. More recently, techniques have become available that can accurately measure the dispersion characteristics of concatenated sections of single-mode fiber and optical amplifiers, such as described by Horiuchi in "Chromatic Dispersion Measurements of 4564 km Optical Amplifier Repeater System," Electronics Letters, Vol. 29, No. 1 1993 p4–6. Typically, dispersion is measured by intensity modulating a tunable optical source, and measuring the delay difference versus the transmitted wavelength. Accurate delay measurements in the picosecond range are achieved by comparing the transmitted and received timing information, usually in the form of a phase detection. Unfortunately, most of the existing techniques require the two ends of the optical cable to be located in close proximity to each other, which is not always possible before a cable has been installed and which is virtually impossible after it has been installed. Moreover, international transoceanic cables systems are often developed by more than one supplier and typically various cable sections are connected only after the different supplier's sections have been installed. Thus, the completed cable is often not available to properly measure its chromatic dispersion characteristics. Therefore, it is important to be able to measure the chromatic dispersion of installed cables, where of course, the cable ends are in different locations. It is also important to be able to determine the chromatic dispersion of installed cables because the dispersion characteristics of cables can change due to a variety of effects such as temperature and pressure and therefore, even if the cable could be accurately measured in the factory, the value of dispersion could be different in the field.

SUMMARY OF THE INVENTION

The present invention provides a method and apparatus for measuring the chromatic dispersion of an optical cable when both the cable ends are not necessarily at the same location. In accordance with the invention, the chromatic dispersion is measured by applying to the cable a signal that rapidly switches between a wavelength generated by a tunable optical source and a different wavelength generated by a reference source. The two sources are modulated in such a way that a delay line phase detection scheme at the far end of the cable can accurately measure relative delay between the tunable source and the reference source. The chromatic dispersion is determined by measuring the relative delay between the two sources for several different wavelengths of the tunable source.

DETAILED DESCRIPTION

Figure 1:
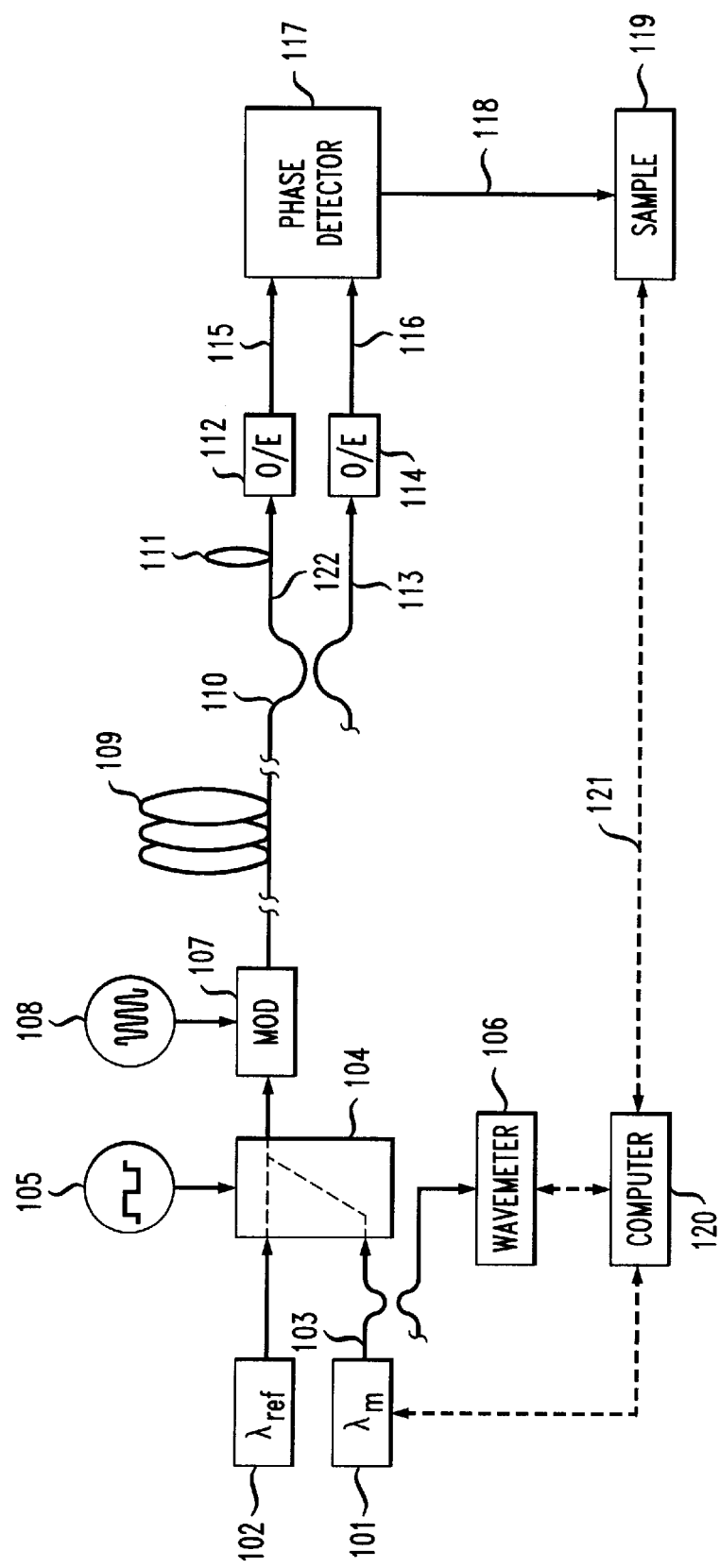
FIG. 1 is a simplified schematic diagram of a chromatic dispersion measurement system in accordance with the present invention.

FIG. 1 shows a simplified schematic diagram of the chromatic dispersion measurement apparatus in accordance with the present invention. Components 101–108 at located at the transmitting end of a transmission system and serve to alternatively provide two different optical wavelengths $\lambda_m$ and $\lambda_{ref}$ that have been intensity modulated with a periodic waveform. Reference wavelength $\lambda_{ref}$ will typically be held fixed while measurement wavelength $\lambda_m$ is varied over some measurement range. The relative delay between the two wavelengths caused by chromatic dispersion in optical cable 109 is measured with components 110–114, which may be located at the receiving end of the transmission system. As discussed in more detail below, the signal received from cable 109 is split into two paths, one of which is delayed by half a switching period so that the signals overlapping in time come from the two different optical sources generating the two wavelengths $\lambda_m$ and $\lambda_{ref}$. The pertinent time delay information is contained in the relative phase between the two signals.

Optical source 101 provides a constant wave (CW) optical signal tunable over a wavelength space in which chromatic dispersion is to be determined. Optical source 102 provides a fixed wavelength CW optical signal at a wavelength that will propagate through the system. Sources 101 and 102 may be of the same or different type. For example, source 101 may be a tunable laser and source 2 may be a fixed wavelength distributed feedback laser diode. The optical signal provided by source 101 is directed to an import port of an optical switch 104 via an optical coupler 103. The optical signal provided by source 102 is directed to a second input port of optical switch 104. Optical switch 104 may be a 2 by 1 optical selector that can couple either one of its two input paths to a single output path. In one particular embodiment of the invention the switch 104 is an electro-optic switch, such as a polarization independent switch sold by Crystal Technology Inc., Palo Alto, Calif. under model number PISW15P. However, the functionality of the optical switch 104 may be performed by a variety of devices, including a 2×2 optical switch and an on/off modulator in series with a passive coupler. Optical switch 104 switches between sources 101 and 102 in response to a signal 105. The signal 105 may be, for example, a square wave having a period $T_{switch}$ about twice the propagation delay in optical delay line 111 (discussed below).

In one embodiment of the invention, coupler 103 provides a path for a portion of the optical source 101 to be directed to an optical wavemeter 106. The wavemeter 106 is used to accurately determine the wavelength of the optical source 101 in those cases where the accuracy of the setting in source 101 itself is deemed inadequate. The optical signals emerging from switch 104 are intensity modulated using an optical modulator 107, which is responsive to a modulating electrical signal 108. Intensity modulator 107 may be a commercially available component such as provided by Lucent Technologies as model 2622, for example. Modulator 107 impresses a modulation on the two optical sources that will ultimately be used to measure the differential time of flight between the optical sources 101 and 102. The electrical signal 108 driving the modulator 107 could be a sinusoidal voltage at a well defined frequency $f_{mod}$ to modulate the signals from sources 101 and 102 with a sinusoidal amplitude envelope. The intensity modulated signals are then transmitted into the transmission path 109 in which chromatic dispersion is to be determined. Transmission path 109, could be, for example, an installed undersea fiber optic cable that uses EDFA repeaters.

At the remote end of the path 109 an optical power splitter 110 divides the incoming power onto two different paths. The optical signal on path 122 is directed through a delay line 111, which could be a length of dispersion-shifted single-mode fiber. The delay $\tau_{delay}$ imposed by delay line 111 may be advantageously selected to be about half of the switching period $T_{switch}$, or:

$$2\tau_{delay} \cong T_{switch} \qquad (1)$$

The optical signal emerging from delay line 111 is converted to an electrical signal by an optical-to-electrical (O/E) converter 112. The optical signal on path 113 is converted to an electrical signal by O/E converter 114. The power splitting ratio of optical splitter 110 is not critical, however it may be a 50/50 coupler. If balanced powers are important, the spitting ratio of splitter 110 could be adjusted to compensate for the excess loss in delay line 111 so that equal optical powers are directed to O/E converters 112 and 114. The instantaneous electrical phase difference between the two signals 115 and 116 at frequency $f_{mod}$ is measured with a phase detector 117 and is provided on line 118. Many known methods of phase detection may be used (see the discussion in connection with FIG. 4 below). The instantaneous phase difference is sampled in a sampling circuit 119 to produce a single value for the phase difference. The measurement may be conveniently performed under control of a computer processor 120, which can control the tunable optical source 101, wavemeter 106 (if provided), and the remotely-located sampling circuit 119 via telemetry line 121.

Figure 2:
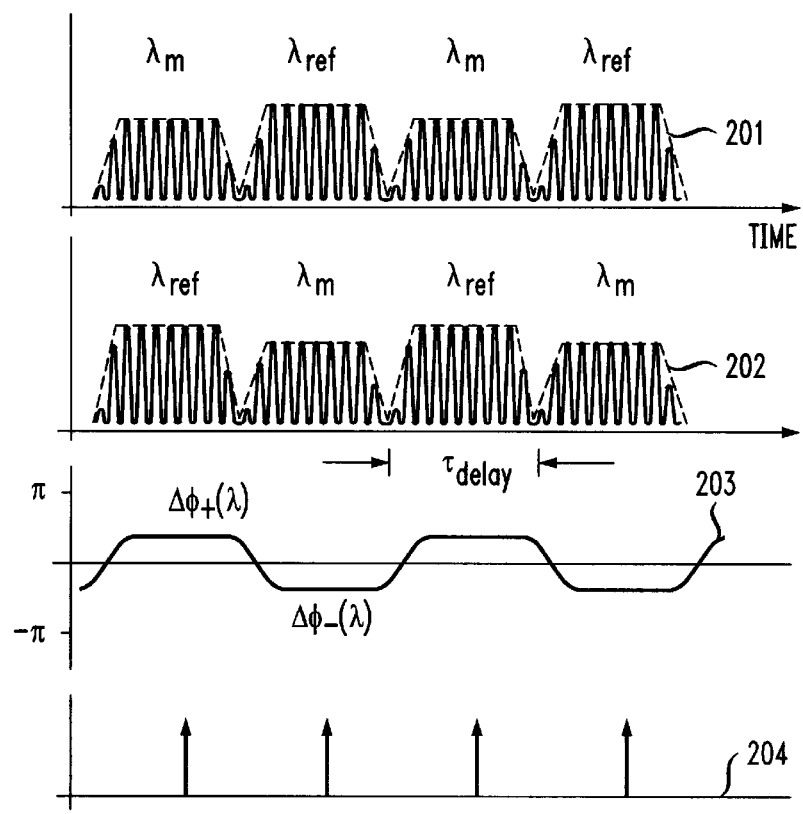
FIG. 2 is a set of graphs illustrating voltage waveforms and timing information in accordance with the present invention.

FIG. 2 shows various waveforms as they are received at different locations in the measurement apparatus. Waveform 201 is output by O/E detector 112 and is directed on line 115 and similarly, waveform 202 is output by O/E detector 114 and is directed on line 116. These two waveforms are similar in shape, but are shifted in time by $\tau_{delay}$ with respect to each other. The dotted line indicates the envelope of sinusoidal modulation at $f_m$ and is shown to indicate the intervals of time where $\lambda_m$ and $\lambda_{ref}$ are present. Waveform 203 shows the demodulated phase difference of sinusoidal signals 201 and 202 at the carrier frequency $f_m$ over the range of $[-\pi,\pi]$ as determined by phase detector 117 and directed on line 118. Since signals $\alpha_m$ and $\alpha_{ref}$ interchange every $\tau_{delay}$ waveform 203 will be symmetric about the time axis. The waveform 203 is sampled to obtain the constant values $\Delta\phi_+(\lambda)$ and $\Delta\phi_-(\lambda)$ at the points in time indicated by the arrows along line 204. The required phase is given by:

$$\Delta\phi(\lambda) = \left[\frac{\Delta\phi_+(\lambda) - \Delta\phi_-(\lambda)}{2}\right] \qquad (2)$$

This phase difference $\Delta\phi(\lambda)$ at the modulation frequency $f_{mod}$ gives a measure of the time of flight difference between $\lambda_m$ and $\lambda_{ref}$ by:

$$\Delta\tau(\lambda) = \frac{\Delta\phi(\lambda)}{360 \cdot f_{mod}} \qquad (3)$$

where $\Delta\phi(\lambda)$ is measured in degrees.

Figure 3:
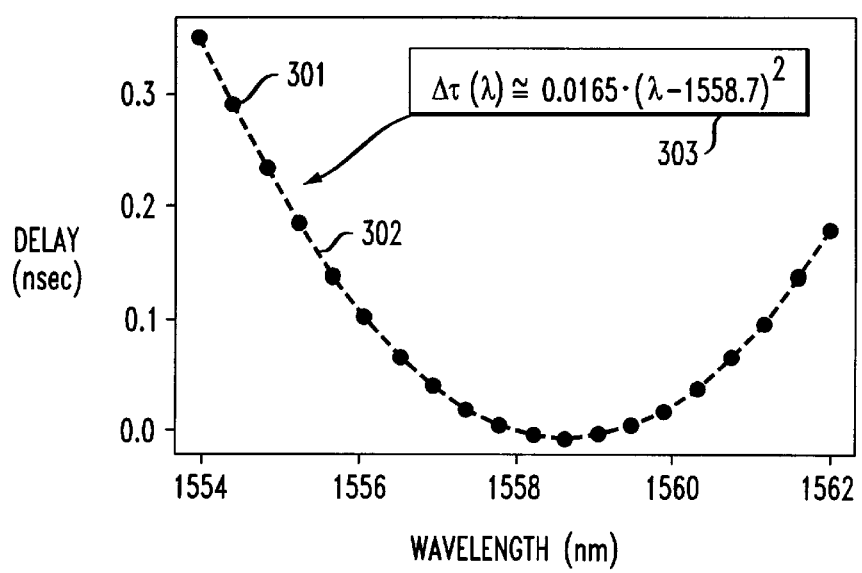
FIG. 3 is a graph illustrating the delay characteristic in an optical path as a function of wavelength.

The previously described technique allows the measurement of the relative delay versus wavelength in an optical path having ends that terminate in different locations. Standard procedures for calculating chromatic dispersion can be applied to the data. FIG. 3 shows the results of a measurement of relative delay versus wavelength in a 454 km optical path of an EDFA amplifier chain, as described in Bergano et al., "100 Gb/s Error Free Transmission over 9100 km using Twenty 5 Gb/s WDM Data Channels," Post-deadline paper PD23, OFC'96 San Jose Calif. The minimum delay has been arbitrary set to zero in this figure. The measured data points 301 were fitted with a "least-square" second order polynomial 302 (given by equation 303 shown in FIG. 3) to obtain the a minimum dispersion wavelength $\lambda_0$ of 1558.7 nm and a dispersion slope 0.033 nsec/nm² or 0.073 psec/km-nm² (in conventional units). To determine the correct chromatic dispersion of the transmission path 109 itself, the chromatic dispersion of delay line 111 must be subtracted. The chromatic dispersion of delay line 111 may be determined by generated for the delay line 111 a graph similar to that shown in FIG. 3.

Figure 4:
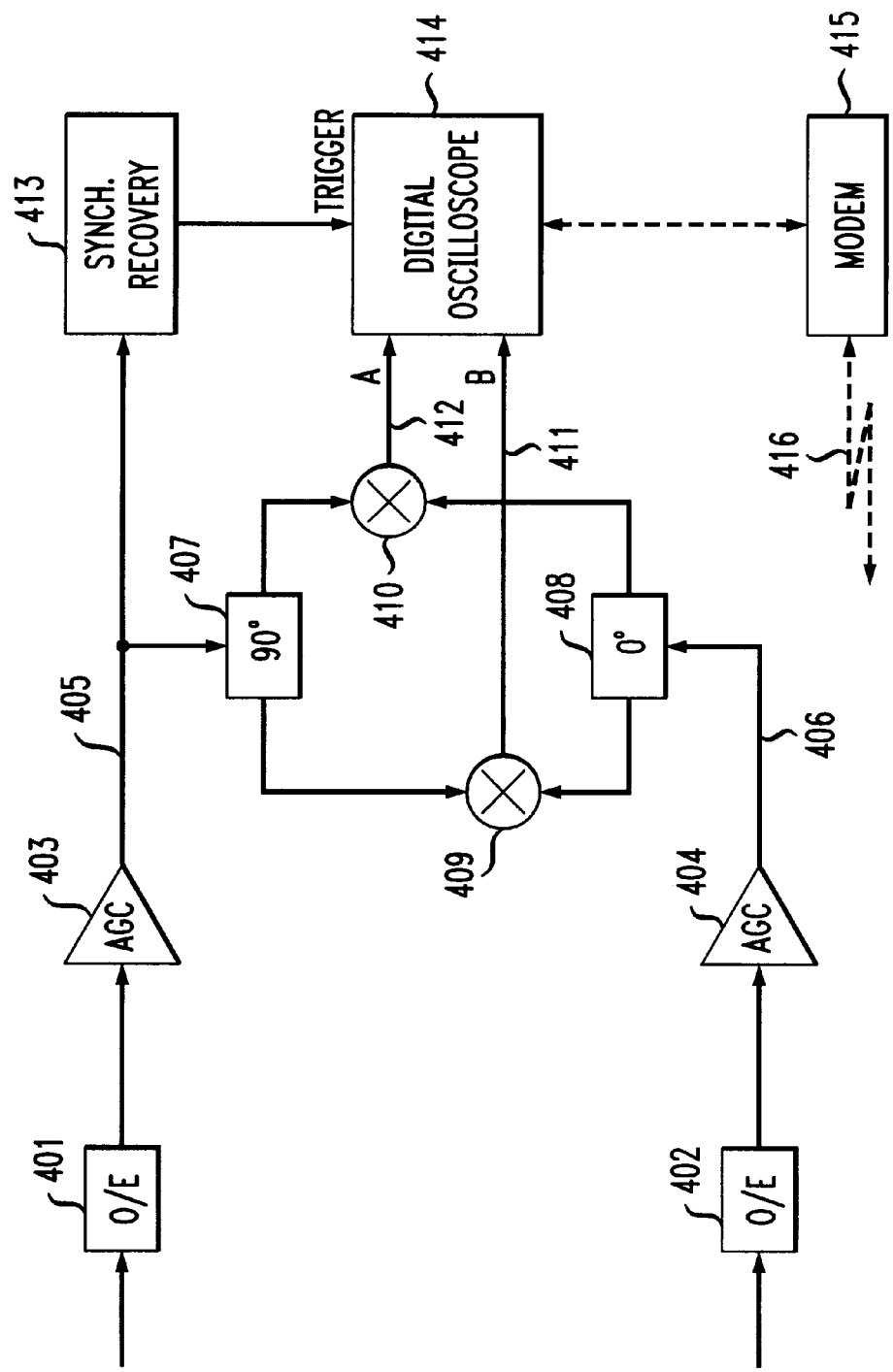
FIG. 4 is a simplified schematic diagram of one embodiment of the receiver section of the dispersion measurement system shown in FIG. 1.

FIG. 4 shows a simplified block diagram of one embodiment of the receiver employed in the present invention (which corresponds to components 110–114 in FIG. 1). The optical signals launched from splitter 110 onto transmission paths 122 and 113 are each converted to electrical signals by O/E converters 401 and 402, respectively. The levels of the two signals are stabilized by automatic gain controlled amplifiers 403 and 404. Of course those skilled in the art can appreciate that this functionality may be achieved by many different arrangements. For example amplifiers 403 and 404 could be limiting amplifiers, or the automatic gain control could be realized with an EDFA. The signals on lines 405 and 406 are similar to the signals 201 and 202 shown in FIG. 2. These two signals are directed to an I&Q demodulator formed by 90° power splitter 407, 0° power splitter 408, and mixers 409 and 410. The I&Q demodulator could be of a design similar to model MQA-10D sold by Mini-Circuits of Brooklyn, N.Y. The output voltage signals from the mixers on lines 411 and 412 contain the phase difference information that is needed to determine chromatic dispersion. Signal 405 is also transmitted to a synchronization recovery circuit 413, which establishes the sampling points 204 shown in FIG. 2. For example, timing recovery circuit 413 could be based on a simple bandpass filter, centered at $1/T_{switch}$ or it could be based on a phase-locked-loop. The timing recovery signal is used as the trigger for a digital oscilloscope 414, which samples signals 411 and 412. Signals 411 and 412 may be sampled by a variety of alternative techniques, including the use of a simple two channel analogue to digital converter in place of the oscilloscope 414. The phase difference $\Delta\phi$ is embedded in the sampled voltages 411 and 412 as $a.\sin(\Delta\phi)$ and $a.\cos(\Delta\phi)$. Thus, the phase could be recovered on the range $[-\pi,\pi]$ by performing a two quadrant arc tangent function. Digital oscilloscope 414 is connected to a modem 415, which is connected to computer 120 (see FIG. 1) over the telemetry path 416.

I claim:

1. A method for determining chromatic dispersion in a first optical transmission path, said method comprising the steps of:
   a. generating first and second optical wavelengths constituting an optical signal, said first and second wavelengths alternating at a modulation frequency;
   b. modulating the intensity of said first and second optical wavelengths to generate first and second intensity modulated wavelengths constituting a modulated optical signal;
   c. transmitting said modulated optical signal through said first optical transmission path having the chromatic dispersion to be determined;
   d. subsequent to step (c), dividing said modulated optical signal into first and second optical signal portions propagating through second and third optical transmission paths, respectively, said second transmission path including a delay path for imparting delay to said first optical signal portion;
   e. determining a relative delay in arrival times between said first and second optical wavelengths;
   f. repeating steps (a)–(e) for a plurality of values of said second optical wavelength to develop a relationship between delay and wavelength characteristic of said first optical transmission path;
   g. extracting the chromatic dispersion from said characteristic relationship.

2. The method of claim 1 wherein step (e) comprises the step of determining a phase difference between said first and second optical signal portions at said modulation frequency after said first and second optical signal portions propagate through said second and third optical paths, respectively.

3. The method of claim 2 wherein said delay is approximately equal to one-half a switching period arising from said modulation frequency.

4. The method of claim 2 wherein step (g) includes the step of removing from said relationship an additional relationship between delay and wavelength characteristic of said delay path in said second transmission path.

5. The method of claim 2 wherein step (e) further comprises the step of transforming said first and second optical signal portions into the electrical domain to determine the relative delay.

\* \* \* \* \*